(12) United States Patent
Zhu

(10) Patent No.: US 8,965,311 B2
(45) Date of Patent: Feb. 24, 2015

(54) METHOD FOR CONTROLLING TERMINAL SIGNAL TRANSMISSION, AND TERMINAL

(71) Applicant: Huawei Device Co., Ltd., Shenzhen (CN)

(72) Inventor: Jian Zhu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/726,860

(22) Filed: Dec. 26, 2012

(65) Prior Publication Data

US 2013/0115900 A1 May 9, 2013

Related U.S. Application Data

(63) Continuation of application No. PCT/CN2011/076970, filed on Jul. 8, 2011.

(30) Foreign Application Priority Data

Jul. 19, 2010 (CN) .......................... 2010 1 0233077

(51) Int. Cl.
H01Q 11/12 (2006.01)
H04W 52/04 (2009.01)
(Continued)

(52) U.S. Cl.
CPC ............ *H04W 52/04* (2013.01); *H04W 52/288* (2013.01); *H04W 52/146* (2013.01); *H04W 52/283* (2013.01); *H04W 52/367* (2013.01)
USPC .......................................... 455/127.1; 455/69

(58) Field of Classification Search
CPC . H04W 52/283; H04W 52/288; H04B 1/3838
USPC ............................... 455/115.1, 127.1, 69, 522
See application file for complete search history.

(56) References Cited

U.S. PATENT DOCUMENTS

2005/0124305 A1 6/2005 Stichelbout
2006/0154687 A1 7/2006 McDowell et al.
(Continued)

FOREIGN PATENT DOCUMENTS

CN 1075235 A 8/1993
CN 101409575 A 4/2009
(Continued)

OTHER PUBLICATIONS

3rd Generation Partnership Project; Technical Specification Group Radio Access Network; Requirements for support of radio resource management (FDD) (Release 9), 3GPP TS 25.133 V9.0.0 (May 2009), pp. 1-225.
(Continued)

Primary Examiner — Lee Nguyen
(74) Attorney, Agent, or Firm — Staas & Halsey LLP

(57) ABSTRACT

Embodiments of the present invention disclose a method for controlling terminal signal transmission, and a terminal. A method for controlling terminal signal transmission includes: monitoring a current working mode of a terminal; transmitting a signal according to first transmit power if it is found through monitoring that the terminal is currently in a first working mode, and transmitting the signal according to second transmit power if it is found through monitoring that the terminal is currently in a second working mode, where the first transmit power is greater than the second transmit power. The technical solution of the embodiments of the present invention helps to enable the terminal to obtain as good radio reception and transmission performance as possible at a same radiation absorption index.

13 Claims, 3 Drawing Sheets

(51) Int. Cl.
*H04W 52/28* (2009.01)
*H04B 1/02* (2006.01)
*H04W 52/14* (2009.01)
*H04W 52/36* (2009.01)

(56) References Cited

U.S. PATENT DOCUMENTS

2009/0305742 A1    12/2009    Caballero et al.
2010/0118805 A1*   5/2010     Ishii et al. .................... 370/329

FOREIGN PATENT DOCUMENTS

| CN | 101668070 A | 3/2010 |
| CN | 101883413 A | 11/2010 |
| CN | 101895977 A | 11/2010 |
| WO | WO 93/16560 | 8/1993 |

OTHER PUBLICATIONS

Extended European Search Report, dated Aug. 9, 2013, in corresponding European Application No. 11809248.5 (9 pages).
Translation of the Written Opinion of the International Searching Authority, dated Oct. 20, 2011, in corresponding International Application No. PCT/CN2011/076970 (9 PP.).
Second Office Action, dated Dec. 10, 2012, in Chinese Application No. 201010233077.5 (11 pp.).
Chinese Office Action mailed Jun. 6, 2013 in corresponding Chinese Application No. 201010233077.5.
International Search Report of Corresponding PCT Application PCT/CN2011/076970 mailed Oct. 20, 2011.
First Chinese Office Action of Chinese Application No. 201010233077.5.

* cited by examiner

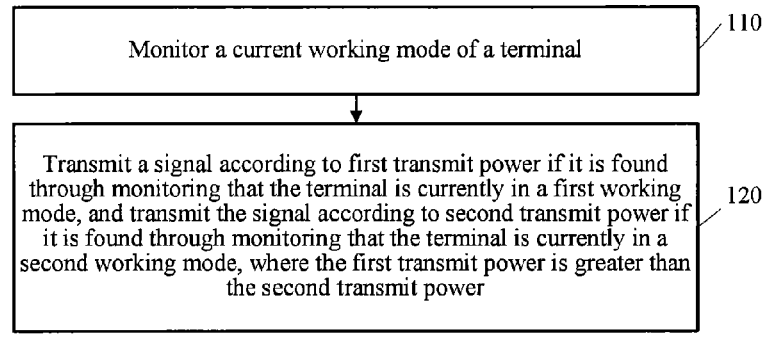
FIG. 1
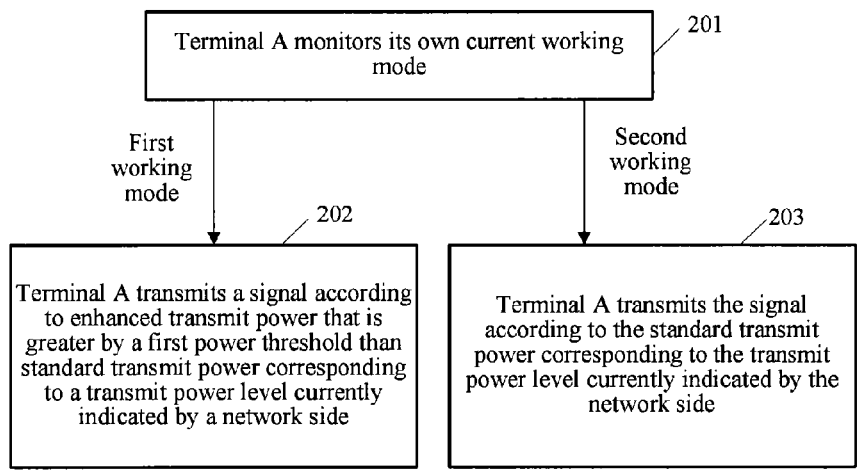
FIG. 2-a
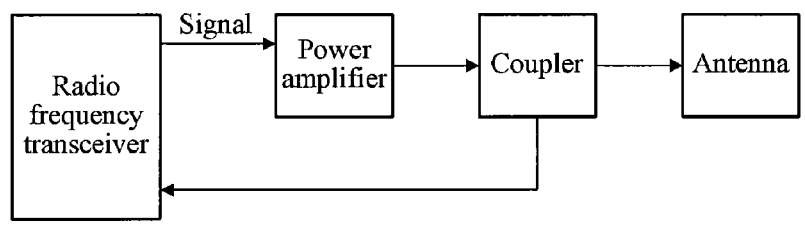
FIG. 2-b

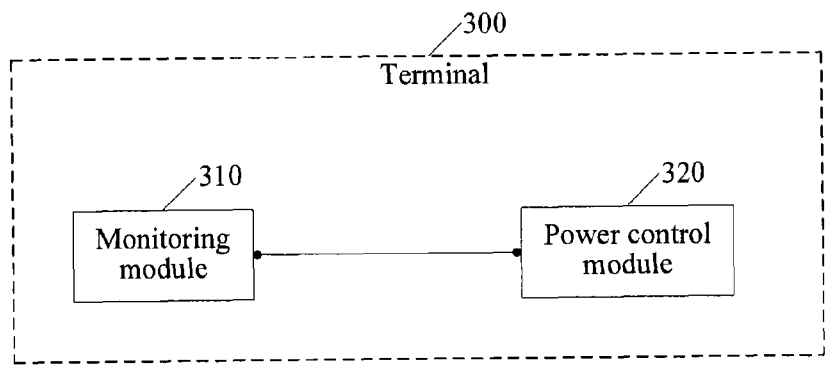
FIG. 3-a
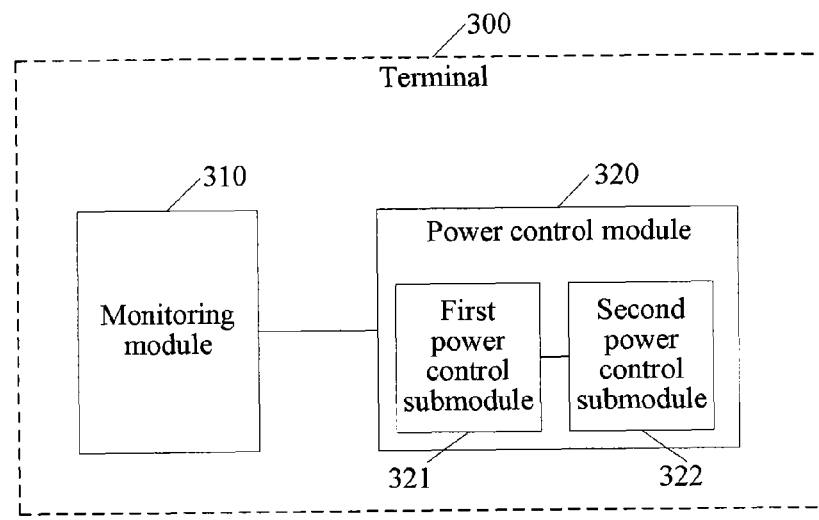
FIG. 3-b

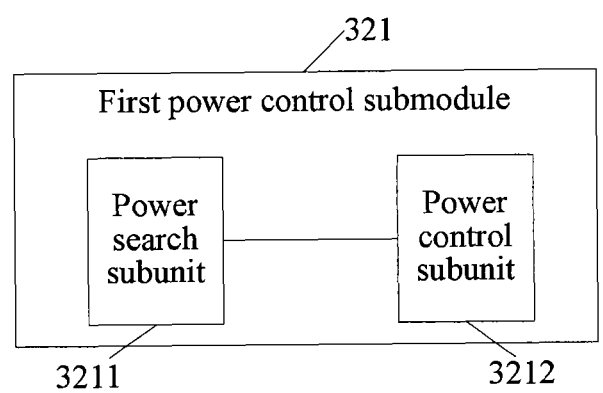
FIG. 3-c
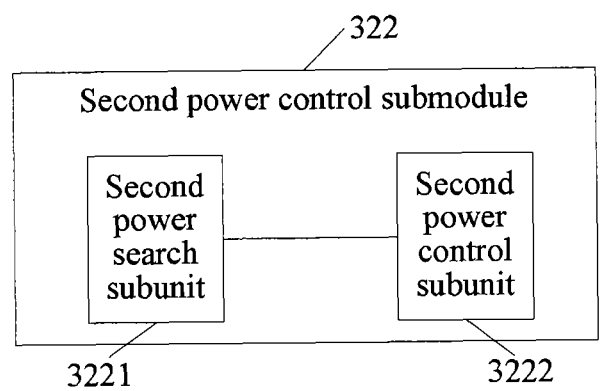
FIG. 3-d

METHOD FOR CONTROLLING TERMINAL SIGNAL TRANSMISSION, AND TERMINAL

CROSS-REFERENCE TO RELATED APPLICATIONS

This application is a continuation of International Application No. PCT/CN2011/076970, filed on Jul. 8, 2011, which claims priority to Chinese Patent Application No. 201010233077.5, filed on Jul. 19, 2010, which is hereby incorporated by reference in its entirety.

FIELD OF THE INVENTION

The present invention relates to the field of communications technologies, and in particular, to a method for controlling terminal signal transmission, and a terminal.

BACKGROUND OF THE INVENTION

At present, communication terminals such as a cell phone are already widely popularized in many regions, and an electromagnetic radiation problem of the cell phone has always been a concern in the industry.

SAR (Specific Absorption Rate) is a radiation absorption index that defines electromagnetic radiation energy absorbed by an organism per unit time and per unit mass.

A service scope of a telecommunication operator is usually limited, and in some edge regions, the signal coverage of a base station is weakened, and a situation such as a call drop or loss of a service easily occurs on a terminal. In this case, the terminal is required to improve its own radio reception and transmission performance to obtain better services. Improving a total radiated power (TRP, Total Radiated Power) index of the terminal is a common means to improve a radio reception and transmission capability of the terminal.

Therefore, how to better balance the radio reception and transmission performance and the radiation absorption index of the terminal, so as to enable the terminal to obtain as good radio reception and transmission performance as possible at a same radiation absorption index, is a meaningful research subject at present.

SUMMARY OF THE INVENTION

Embodiments of the present invention provide a method for controlling terminal signal transmission, and a terminal, which help to enable the terminal to obtain as good radio reception and transmission performance as possible at a same radiation absorption index.

In order to solve the foregoing technical problems, the embodiments of the present invention provide the following technical solutions.

A method for controlling terminal signal transmission includes:

monitoring a current working mode of a terminal; and transmitting a signal according to first transmit power if it is found through monitoring that the terminal is currently in a first working mode, and transmitting the signal according to second transmit power if it is found through monitoring that the terminal is currently in a second working mode, where the first transmit power is greater than the second transmit power.

A terminal includes:

a monitoring module, configured to monitor a current working mode of a terminal; and a power control module, configured to transmit a signal according to first transmit power when the monitoring module finds, through monitoring, that the terminal is currently in a first working mode, and transmit the signal according to second transmit power when the monitoring module finds, through monitoring, that the terminal is currently in a second working mode, where the first transmit power is greater than the second transmit power.

It can be seen above that, in the embodiments of the present invention, the current working mode of the terminal is monitored, and different transmit power is adopted to transmit the signal according to different monitored working modes of the terminal. This mechanism improves the flexibility of control over signal transmit power, and different transmit power is adopted in different working modes, which helps to enable the terminal to obtain as good radio reception and transmission performance as possible at the same radiation absorption index, and then improves user experience of a user.

BRIEF DESCRIPTION OF THE DRAWINGS

To illustrate technical solutions in embodiments of the present invention more clearly, accompanying drawings required for describing the embodiments are introduced below briefly. Apparently, the accompanying drawings in the following descriptions merely show some of the embodiments of the present invention, and persons of ordinary skill in the art can obtain other drawings according to these accompanying drawings without creative efforts.

FIG. 1 is a flow chart of a method for controlling terminal signal transmission according to an embodiment of the present invention;

FIG. 2-*a* is a flow chart of another method for controlling terminal signal transmission according to an embodiment of the present invention;

FIG. 2-*b* is a schematic diagram of a power amplification circuit of a terminal according to an embodiment of the present invention;

FIG. 3-*a* is a schematic structural diagram of a terminal according to an embodiment of the present invention;

FIG. 3-*b* is a schematic structural diagram of another terminal according to an embodiment of the present invention;

FIG. 3-*c* is a schematic structural diagram of a power control submodule according to an embodiment of the present invention; and FIG. 3-*d* is a schematic structural diagram of another power control submodule according to an embodiment of the present invention.

DETAILED DESCRIPTION OF THE EMBODIMENTS

Technical solutions in embodiments of the present invention are hereinafter described clearly and completely with reference to accompanying drawings in the embodiments of the present invention. Evidently, the described embodiments are only part rather than all of the embodiments of the present invention. Based on the embodiments of the present invention, all other embodiments obtained by persons of ordinary skill in the art without creative efforts shall fall within the protection scope of the present invention.

When a service is performed, a transmit power level of a terminal may be designated by a network side. For example, in a third generation partnership project (3GPP, 3rd Generation Partnership Project) protocol, for different communication systems, the number of transmit power levels of the terminal is stipulated, and standard transmit power corresponding to each transmit power level is also stipulated, where an error of 2 to 3 decibels (dB) is allowed between actual transmit power of the terminal and the standard transmit power at a same transmit power level.

Detailed descriptions are provided below through specific embodiments. Referring to FIG. 1, an embodiment of a method for controlling terminal signal transmission in the embodiments of the present invention may include:

110: Monitor a current working mode of a terminal.

In an application scenario, when the terminal performs a communication service, its working modes may be classified into two types. One is a working mode in which a user is still capable of using the terminal to perform a service normally when the terminal is away from the body (such as the head) of the user, which is referred to as a first working mode for short below. The first working mode includes, for example, a working mode such as a working mode in which the user uses a headset (such as a bluetooth headset and a wired headset) to make a call, a working mode in which a handsfree function is used to make a call, or a data service transmission mode. The other is a working mode in which a user is capable of using the terminal to perform a service normally only when the terminal is close to the body of the user, which is referred to as a second working mode for short below. The second working mode includes, for example, a conventional voice call mode, in which the user needs to put a receiver of the terminal close to an ear to make a call normally.

The foregoing term "away from" or "close to" may be defined as being greater or smaller than a preset first distance threshold respectively. A value range of the first distance threshold may be defined according to actual demands, and for example, it is defined that the value range of the first distance threshold is greater than 0.2 meter.

In specific implementation, the terminal may automatically monitor its current working mode when performing a service, and definitely, may monitor its current working mode under control of the user.

Various implementation manners may be adopted to detect the current working mode of the terminal. For example, when the terminal performs a call service, if it is detected that the terminal is connected to a wireless or wired headset, or it is detected that a handsfree button on the terminal is pressed, or it is detected that the terminal only performs a data service currently, indicating that the user is still capable of using the terminal to perform the service normally even if the terminal is away from the body (such as the head) of the user at this time, it is determined that the terminal is currently in the first working mode. For another example, when the terminal performs a call service, if the terminal senses through a light sensor that the body (such as the head) of the user is close to the terminal, or senses through a distance sensor that a distance between the terminal and the body (such as the head) of the user is smaller than the first distance threshold, and/or, it is detected that the terminal is performing the call service without using the working mode such as a headset or a handsfree function in which the user is still capable of using the terminal to perform a service normally even if the terminal is away from the body (such as the head) of the user by at least a first distance threshold, indicating that the user may use the terminal to perform a service normally only when the terminal keeps a very small distance from the body of the user, it is determined that the terminal is currently in the second working mode. The rest may be deduced by analogy.

120: Transmit a signal according to first transmit power if it is found through monitoring that the terminal is currently in a first working mode, and transmit the signal according to second transmit power if it is found through monitoring that the terminal is currently in a second working mode, where the first transmit power is greater than the second transmit power.

In an embodiment, if it is found through monitoring that the terminal is currently in the first working mode, the signal is transmitted according to enhanced transmit power that is greater by a first power threshold than standard transmit power corresponding to a transmit power level currently indicated by the network side.

A value of the first power threshold may be set according to actual demands. Definitely, the first power threshold is usually smaller than or equal to a maximum error which is allowed in a protocol and is between actual transmit power of the terminal and the standard transmit power at a same transmit power level. For example, the value of the first power threshold may be 1 to 2 decibels.

Further, if it is found through monitoring that the terminal is currently in the second working mode, the terminal, for example, may transmit the signal according to the standard transmit power (or transmit power smaller than the standard transmit power) corresponding to the transmit power level currently indicated by the network side.

It should be noted that, the technical solution of the embodiment may be implemented on a terminal such as a cell phone, and definitely may also be implemented on other similar communication devices such as a tablet computer, a netbook computer, and so on.

It can be seen above that, in the embodiment, the current working mode of the terminal is monitored, and different transmit power is adopted to transmit the signal according to different working modes of the terminal, where the working modes are found through monitoring. This mechanism improves the flexibility of control over signal transmit power, and different transmit power is adopted in different working modes, which helps to enable the terminal to obtain as good radio reception and transmission performance as possible at a same radiation absorption index, and then improves user experience of the user.

For better understanding of the technical solution of the embodiment of the present invention, a process of controlling signal transmission of terminal A is taken as an example below for further illustration. Referring to FIG. 2, another embodiment of a method for controlling terminal signal transmission in the embodiments of the present invention may include:

201: Terminal A monitors its own current working mode.

In an application scenario, when terminal A performs a communication service, its working modes may be classified into two types. One is a working mode in which a user is still capable of using terminal A to perform a service normally when terminal A is away from the body (such as the head) of the user, which is referred to as a first working mode for short below. The first working mode may include, for example, a working mode such as a working mode in which the user uses a headset (such as a bluetooth headset and a wired headset) to make a call, a working mode in which a handsfree function is used to make a call, or a data service transmission mode. The other is a working mode in which a user is capable of using terminal A to perform a service normally only when terminal A is close to the body of the user, which is referred to as a second working mode for short below. The second working mode includes, for example, a conventional voice call mode in which the user needs to put a receiver of terminal A close to an ear to make a call normally.

In practical applications, terminal A may, for example, automatically monitor its own current working mode when performing a service, or terminal A may monitor its own current working mode under control of the user. If terminal A finds, through monitoring, that terminal A is currently in the first working mode, step 202 is performed; and if it is found through monitoring that terminal A is currently in the second working mode, step 203 may be performed.

The foregoing term "away from" or "close to" may be defined as being greater or smaller than a preset first distance threshold respectively. A value range of the first distance threshold may be defined according to actual demands, and for example, it is defined that the value range of the first distance threshold is greater than 0.2 meter.

There may be various specific manners for terminal A to detect the current working mode. For example, when terminal A performs a call service, if it is detected that terminal A is connected to a wireless or wired headset, or it is detected that a handsfree button on terminal A is pressed (namely, a handsfree function is used), or it is detected that terminal A only performs a data service currently, indicating that the user is still capable of using terminal A to perform a service normally even if terminal A is away from the body (such as the head) of the user, it is determined that terminal A is currently in the first working mode. For another example, when terminal A performs a call service, if the terminal senses through a light sensor that the body (such as the head) of the user is close to the terminal, or senses through a distance sensor that a distance between the terminal and the body (such as the head) of the user is smaller than the first distance threshold, and/or, it is detected that terminal A is performing the call service without using the working mode such as the headset or a handsfree function in which the user is still capable of using terminal A to perform a service normally even if terminal A is away from the body (such as the head) of the user, indicating that the user may use the terminal to perform the service only when the terminal keeps a very small distance from the body of the user, it is determined that the terminal is currently in the second working mode. The rest may be deduced by analogy.

202: Terminal A transmits a signal according to enhanced transmit power that is greater by a first power threshold than standard transmit power corresponding to a transmit power level currently indicated by a network side.

A value of the first power threshold may be set according to actual demands. Definitely, the first power threshold is required to be smaller than or equal to a maximum error which is allowed in a protocol and is between actual transmit power of the terminal and the standard transmit power at a same transmit power level. For example, the value of the first power threshold can be 1 to 2 decibels.

Referring to a schematic diagram of a power amplification circuit of the terminal shown in FIG. 2-*b*, in signal transmission, after being output from a radio frequency transceiver of the terminal, the signal is amplified by a power amplifier, transported to an antenna through a coupler, and transmitted. At the same time, the coupler couples a part of power from transmit power, and feeds the part of power back to the radio frequency transceiver for power detection.

A power table G1 and a power table G2 may be preset in terminal A. The power table G1 records correspondence between output power of the radio frequency transceiver of terminal A and output power of an antenna port. The power table G1 may be obtained by changing the output power of the radio frequency transceiver while detecting the output power of the antenna port. The power table G1 serves as a basis for controlling open-loop power of the circuit. Meanwhile, magnitude of the power fed back by the coupler to the radio frequency transceiver (referred to as coupling power for short) is detected. The power table G2 is used to record correspondence between the coupling power and antenna port power. The power table G2 serves as a basis for controlling closed-loop power of the circuit.

A power table G3 and a power table G4 may be further preset in terminal A. The power table G3 is used to record correspondence between each transmit power level and standard transmit power. The power table G4 is used to record correspondence between each transmit power level and enhanced transmit power, where the enhanced transmit power corresponding to each transmit power level may be greater by the first power threshold than the standard transmit power corresponding to each transmit power level.

In an application scenario, if terminal A finds, through monitoring, that terminal A itself is currently in the first working mode, terminal A may, for example, search the preset power table G4 according to the transmit power level currently indicated by the network side, find enhanced transmit power corresponding to the transmit power level, and then control the radio frequency transceiver to output, according to the table G1, initial power corresponding to the found enhanced transmit power, and then detect magnitude of the power fed back by the coupler, and dynamically adjust the output power of the radio frequency transceiver to satisfy the correspondence in the power table G2, until the output power of the antenna port satisfies the correspondence in the power table G4, and finally implements that terminal A transmits the signal according to the found enhanced transmit power corresponding to the transmit power level currently indicated by the network side.

203: Terminal A transmits the signal according to the standard transmit power corresponding to the transmit power level currently indicated by the network side.

In an application scenario, if terminal A finds, through monitoring, that the terminal A itself is currently in the second working mode, terminal A may, for example, search the preset power table G3 according to the transmit power level currently indicated by the network side, find standard transmit power corresponding to the transmit power level, and then control the radio frequency transceiver to output, according to the table G1, initial power corresponding to the found standard transmit power, and then detect the magnitude of the power fed back by the coupler, and dynamically adjust the output power of the radio frequency transceiver to satisfy the correspondence in the power table G2, until the output power of the antenna port satisfies the correspondence in the power table G3, and finally implements that terminal A transmits the signal according to the found standard transmit power corresponding to the transmit power level indicated by the network side.

Further illustration is given below through an instance. For example, terminal A currently accesses a wideband code division multiple access (WCDMA, Wideband Code Division Multiple Access) system, and a base station of the WCDMA instructs terminal A to perform transmission according to a $15^{th}$ transmit power level. For example, it is stipulated in the protocol that standard transmit power corresponding to the $15^{th}$ transmit power level is 24 dB, and enhanced transmit power that corresponds to the $15^{th}$ transmit power level and is recorded in the preset power table G4 of terminal A is, for example, 25.5 dB.

Terminal A monitors its own current working mode, and if it is found that terminal A itself is currently making a call through a bluetooth headset, that is, terminal A is currently in the first working mode, terminal A searches the power table G4, and transmits the signal according to the enhanced transmit power of 25.5 dB that corresponds to the $15^{th}$ transmit power level and is recorded in the power table G4. In some regions with weak signals, this manner may improve service quality.

If terminal A finds, through monitoring, that terminal A is currently in a conventional voice call mode, and the user needs to put the receiver of the terminal close to an ear to make a call normally, that is, terminal A is currently in the second working mode, terminal A may search the power table G3, and transmit the signal according to standard transmit power of 24 dB that corresponds to the $15^{th}$ transmit power level and is recorded in the power table G3.

It can be seen above that, in this embodiment, the terminal monitors its own current working mode, and when it is found through monitoring that the terminal is currently in a working mode in which the terminal can perform a service away from the body of the user, the terminal transmits the signal according to enhanced transmit power greater than the standard transmit power corresponding to the transmit power level currently indicated by the network side. A mechanism for monitoring and judging the working mode of the terminal and a mechanism for flexibly adjusting the transmit power of the terminal are introduced, which helps to enable the terminal to obtain as good radio reception and transmission performance as possible at the same radiation absorption index, and then improves user experience of the user.

To better implement the technical solutions of the embodiment of the present invention, an embodiment of the present invention further provides a terminal. Referring to FIG. 3, a terminal 300 provided by an embodiment of the present invention may include: a monitoring module 310 and a power control module 320.

The monitoring module 310 is configured to monitor a current working mode of the terminal.

In an application scenario, when the terminal 300 performs a service, its working modes may be classified into two types. One is a working mode in which a user is still capable of using the terminal 300 to perform a service normally when the terminal 300 is away from the body (such as the head) of the user, which is referred to as a first working mode for short. The first working mode includes, for example, a working mode such as a working mode in which the user uses a headset (such as a bluetooth headset and a wired headset) to make a call, a working mode in which a handsfree function is used to make a call, or a data service transmission mode. The other is a working mode in which the user is capable of using the terminal 300 to perform a service normally only when the terminal 300 is close to the body of the user, which is referred to as a second working mode for short. The second working mode includes, for example, a conventional voice call mode in which the user needs to put a receiver of the terminal 300 close to an ear to make a call normally.

The foregoing term "away from" or "close to" may be defined as being greater or smaller than a preset first distance threshold respectively. A value range of the first distance threshold may be defined according to actual demands, and for example, it is defined that the value range of the first distance threshold is greater than 0.2 meter.

In specific implementation, the monitoring module 310 may automatically monitor its current working mode when a service is performed, and definitely, may monitor its current working mode under control of the user.

There may be various specific manners for the monitoring module 310 to detect the current working mode of the terminal 300. For example, when the terminal 300 performs a call service, if it is detected that the terminal 300 is connected to a wireless or wired headset, or it is detected that a handsfree button on the terminal 300 is pressed (that is, a handsfree function is used), or it is detected that the terminal only performs a data service currently, indicating that the user is still capable of using the terminal 300 to perform a service normally even if the terminal 300 is away from the body (such as the head) of the user by at least a first distance threshold, it is determined that the terminal 300 is currently in the first working mode. For another example, when the terminal 300 performs a call service, if the monitoring module 310 of the terminal 300 senses through a light sensor that the body (such as the head) of the user is close to the terminal 300, or the monitoring module 310 of the terminal 300 senses through a distance sensor that a distance between the terminal 300 and the body (such as the head) of the user is smaller than the first distance threshold, and/or, it is detected that the terminal 300 does not use the working mode such as the headset or a handsfree function in which the user is still capable of using the terminal 300 to perform a service normally even if the terminal 300 is away from the body (such as the head) of the user by at least a first distance threshold, indicating that the user may use the terminal 300 to perform the service normally only when the terminal 300 keeps a very small distance from the body of the user, it is determined that the terminal 300 is currently in the second working mode. The rest may be deduced by analogy.

In an embodiment, the monitoring module 310 may specifically be configured to, if it is detected that the terminal 300 performing a call service is connected to the headset or uses the handsfree function, or it is detected that the terminal 300 only performs a data service currently, determine that the terminal 300 is in the first working mode; and if it is sensed through the light sensor that the terminal 300 performing a call service is close to the body of the user, or it is sensed through the distance sensor that a distance between the terminal 300 performing a call service and the body of the user is smaller than the first distance threshold, or it is detected that the terminal 300 performing a call service does not use the headset or the handsfree function, determine that the terminal 300 is in the second working mode.

The power control module 320 is configured to transmit a signal according to first transmit power when the monitoring module 310 finds, through monitoring, that the terminal is currently in the first working mode; and transmit the signal according to second transmit power when the monitoring module 310 finds, through monitoring, that the terminal is currently in the second working mode, where the first transmit power is greater than the second transmit power.

Referring to FIG. 3-b, in an application scenario, the power control module 320 may include:

a first power control submodule 321, configured to, when the monitoring module 310 finds, through monitoring, that the terminal is currently in the first working mode, transmit the signal according to enhanced transmit power that is greater by a first power threshold than standard transmit power corresponding to a transmit power level currently indicated by a network side.

The power control module 320 may further include:

a second power control submodule 322, configured to, when the monitoring module 310 finds, through monitoring, that the terminal is currently in the second working mode, transmit the signal according to the standard transmit power (or transmit power smaller than the standard transmit power) corresponding to the transmit power level currently indicated by a network side.

Referring to FIG. 3-c, in an application scenario, the first power control submodule 321 may include:

a power search subunit 3211, configured to, when the monitoring module 310 finds, through monitoring, that the terminal is currently in the first working mode, search a preset power table G4 according to the transmit power level currently indicated by the network side, where the power table G4 records correspondence between each transmit power level and enhanced transmit power, and the enhanced transmit power corresponding to each transmit power level is greater by the first power threshold than standard transmit power corresponding to each transmit power level; and a power control subunit 3212, configured to transmit the signal according to enhanced transmit power that is found by the power search subunit 3211 and corresponds to the transmit power level currently indicated by the network side.

Referring to FIG. 3-d, in an application scenario, the second power control submodule 322 may include:

a second power search subunit 3221, configured to, when the monitoring module 310 finds, through monitoring, that the terminal is currently in the second working mode, search a preset power table G3 according to the transmit power level currently indicated by the network side, where the power table G3 records correspondence between each transmit power level and standard transmit power; and a second power control subunit 3222, configured to transmit the signal according to standard transmit power that is found by the second power search subunit 3221 and corresponds to the transmit power level currently indicated by the network side.

In an application scenario, the first working mode may be one or more of the following working modes:

a working mode of making a call by using a headset, a working mode of making a call by using a handsfree function, and a data service transmission mode.

In an application scenario, a value range of the first power threshold may be 1 to 2 decibels.

It should be noted that in the embodiment, the terminal 300 may be terminal A in the foregoing method embodiment, and may be used to implement all the technical solutions in the foregoing method embodiments. A function of each of its function module may be specifically implemented according to the methods in the foregoing method embodiments. For a specific implementation process, reference may be made to related descriptions in the foregoing embodiments, and details are not described herein again.

It should be noted that, for brevity of description, the foregoing method embodiments are expressed as a series of actions. But those skilled in the art should know that the present invention is not limited to the order of the described actions, because according to the present invention, some steps may adopt other order or may be performed simultaneously. In addition, those skilled in the art should also know that the described embodiments are all exemplary embodiments, and the involved actions and modules are not necessarily required by the present invention.

In the foregoing embodiments, the description of each embodiment has its own emphasis, and for a part that is not detailed in one embodiment, reference may be made to the relevant description of other embodiments.

In conclusion, in the embodiments of the present invention, the terminal monitors its own current working mode, and when it is found through monitoring that the terminal is currently in a working mode in which the terminal can perform a service away from the body of the user, the terminal transmits the signal according to the enhanced transmit power greater than the standard transmit power corresponding to the transmit power level currently indicated by the network side. The mechanism for monitoring and judging the working mode of the terminal and the mechanism for flexibly adjusting the transmit power of the terminal are introduced, which helps to enable the terminal to obtain as good radio reception and transmission performance as possible at the same radiation absorption index, and then improves the user experience of the user.

Persons of ordinary kill in the art can understand that all or part of the steps in each method in the foregoing embodiment may be completed by a program instructing the hardware. The program can be stored in a computer readable storage medium. The storage medium may include a read-only memory (ROM, Read-Only Memory), a random access memory (RAM, Random Access Memory), a magnetic disk, an optical disk or the like.

The method for controlling terminal signal transmission and the terminal which are provided by the embodiments of the present invention are introduced in detail above. Specific cases are used for illustrating principles and implementation manners of the present invention. The illustration of the foregoing embodiments is merely used for understanding the method and core ideas of the present invention. Meanwhile, persons of ordinary skill in the art may make modifications to the specific implementation manners and application scopes according to the ideas of the present invention. In conclusion, the content of this specification shall not be construed as a limitation to the present invention.

What is claimed is:

1. A method for controlling terminal signal transmission, comprising:
   monitoring a current working mode of a terminal;
   receiving, by the terminal, an instruction from a base station instructing the terminal to transmit at a specific transmit power level;
   transmitting a signal according to a first transmit power, which is an enhanced transmit power that is greater by a first power threshold than the specific transmit power level at which the terminal was instructed to transmit by the base station, if it is found through monitoring that the terminal is currently in a first working mode; and
   transmitting the signal according to a second transmit power if it is found through monitoring that the terminal is currently in a second working mode, wherein the first transmit power is greater than the second transmit power.

2. The method according to claim 1, wherein the first working mode is a working mode in which a user is still capable of using the terminal to perform a service normally when a distance between the terminal and the body of the user is at least a first distance threshold.

3. The method according to claim 1, wherein
   the monitoring the current working mode of the terminal comprises:
   if it is detected that the terminal performing a call service is connected to a headset or uses a handsfree function, or it is detected that the terminal only performs a data service currently, determining that the terminal is in the first working mode; and
   if it is sensed through a light sensor that the terminal performing a call service is close to the body of the user, or it is sensed through a distance sensor that a distance between the terminal performing a call service and the body of the user is smaller than a first distance threshold, or it is detected that the terminal performing a call service does not use the headset or the handsfree function, determining that the terminal is in the second working mode.

4. The method according to claim 2, wherein
   the transmitting the signal according to the first transmit power comprises:

searching a preset power table, preset in the terminal, according to the specific transmit power level at which the terminal was instructed to transmit by the base station, wherein
  the power table records correspondence between transmit power levels and enhanced transmit powers, respectively, and
  for each respective transmit power level, the corresponding enhanced transmit power is greater by the first power threshold than a standard transmit power corresponding to the respective transmit power level,
  to thereby find, from the power table, an enhanced power corresponding to the specific transmit power level at which the terminal was instructed to transmit by the base station; and
transmitting the signal according to the found enhanced transmit power corresponding to the specific transmit power level at which the terminal was instructed to transmit by the base station.

5. The method according to claim 2, wherein
a value range of the first power threshold is 1 to 2 decibels.

6. The method according to claim 1, wherein the first working mode is one or more of the following working modes:
  a working mode of making a call by using a headset, a working mode of making a call by using a handsfree function, and a data service transmission mode.

7. A non-transitory readable storage medium of a computing apparatus, wherein the storage medium stores a computer program, and the program is configured to instruct the computing apparatus to perform the method according to claim 1.

8. A terminal, comprising:
  a monitoring module, configured to monitor a current working mode of the terminal; and
  a power control module, configured to transmit a signal according to a first transmit power, which is an enhanced transmit power that is greater by a first power threshold than a specific transmit power level at which the terminal was instructed to transmit by a base station, when the monitoring module finds, through monitoring, that the terminal is currently in a first working mode, and to transmit the signal according to a second transmit power when the monitoring module finds, through monitoring, that the terminal is currently in a second working mode, wherein the first transmit power is greater than the second transmit power.

9. The terminal according to claim 8, wherein
the first working mode is a working mode that a user is still capable of using the terminal to perform a service normally when a distance between the terminal and the body of the user is at least a first distance threshold.

10. The terminal according to claim 9, wherein
the first power control submodule comprises:
a power search subunit, configured to, when the monitoring module finds, through monitoring, that the terminal is currently in the first working mode, search a preset power table, preset in the terminal, according to the specific transmit power level at which the terminal was instructed to transmit by the base station, wherein the power table records correspondence between transmit power levels and enhanced transmit powers, respectively, and, for each respective transmit power level, the corresponding enhanced transmit power is greater by the first power threshold than a standard transmit power corresponding to the respective transmit power level, to thereby find, from the power table, an enhanced power corresponding to the specific transmit power level at which the terminal was instructed to transmit by the base station; and
a power control subunit, configured to transmit the signal according to the enhanced transmit power that is found by the power search subunit and corresponds to the specific transmit power level at which the terminal was instructed to transmit by the base station.

11. The terminal according to claim 8, wherein
the monitoring module is specifically configured to, if it is detected that the terminal performing a call service is connected to a headset or uses a handsfree function, or it is detected that the terminal only performs a data service, determine that the terminal is in the first working mode; and if it is sensed through a light sensor that the terminal performing a call service is close to the body of the user, or it is sensed through a distance sensor that a distance between the terminal performing a call service and the body of the user is smaller than the first distance threshold, or it is detected that the terminal performing a call service does not use the headset or the handsfree function, determine that the terminal is in the second working mode.

12. The terminal according to claim 8, wherein the power control module further comprises:
a second power control submodule, configured to, when the monitoring module finds, through monitoring, that the terminal is currently in the second working mode, transmit the signal according to a standard transmit power corresponding to the specific transmit power level at which the terminal was instructed to transmit by the base station, or according to power smaller than the standard transmit power.

13. The terminal according to claim 12, wherein the second power control subunit specifically comprises:
a second power search subunit, configured to, when the monitoring module finds, through monitoring, that the terminal is currently in the second working mode, search a preset power table, preset on the terminal, according to the specific transmit power level at which the terminal was instructed to transmit by the base station, wherein the power table records correspondence between transmit power levels and standard transmit powers, respectively, to thereby find a standard transmit power corresponding to the specific transmit power level at which the terminal was instructed to transmit by the base station; and
a second power control subunit, configured to transmit the signal according to the standard transmit power that is found by the second power search subunit and corresponds to the specific transmit power level at which the terminal was instructed to transmit by the base station.

* * * * *